(12) United States Patent
Sadamitsu et al.

(10) Patent No.: US 6,429,396 B1
(45) Date of Patent: Aug. 6, 2002

(54) ELECTRIC DISCHARGE PROCESSING POWER SUPPLY HAVING A PROTECTION NETWORK FOR THE SWITCHING ELEMENT

(75) Inventors: Daisuke Sadamitsu; Yuji Kaneko, both of Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/424,534

(22) PCT Filed: Mar. 29, 1999

(86) PCT No.: PCT/JP99/01637

§ 371 (c)(1),
(2), (4) Date: Feb. 15, 2000

(87) PCT Pub. No.: WO99/50017

PCT Pub. Date: Oct. 7, 1999

(30) Foreign Application Priority Data

Mar. 27, 1998 (JP) .......................... 10-098109

(51) Int. Cl.⁷ ............................................. B23H 1/02
(52) U.S. Cl. ............................... 219/69.19; 219/69.13; 219/69.18
(58) Field of Search .................... 219/69.13, 69.18, 219/69.19

(56) References Cited

U.S. PATENT DOCUMENTS

| | | | | |
|---|---|---|---|---|
| 3,805,012 A | * | 4/1974 | Bell, Jr. et al. | 219/69.19 |
| 4,673,789 A | * | 6/1987 | Ozaki et al. | 219/69.13 |
| 4,952,790 A | * | 8/1990 | Futamura | 219/69.13 |
| 5,182,474 A | * | 1/1993 | Kaneko | 219/69.18 |
| 5,352,859 A | * | 10/1994 | Kaneko et al. | 219/69.13 |
| 5,936,361 A | * | 8/1999 | Yamashita et al. | |

FOREIGN PATENT DOCUMENTS

| | | | | |
|---|---|---|---|---|
| JP | 48-51397 | | 7/1973 | |
| JP | 59-64225 | * | 4/1984 | 219/69.13 |
| JP | 61-214919 | * | 9/1986 | 219/69.13 |
| JP | 7-1234 | | 1/1995 | |
| JP | 7-9256 | | 1/1995 | |
| JP | 9-314420 | | 1/1995 | |

* cited by examiner

Primary Examiner—Geoffrey S. Evans
(74) Attorney, Agent, or Firm—McDermott, Will & Emery; Paul Devinsky

(57) ABSTRACT

A power supply for an electric discharge machine which provides electrical power intermittently for discharge machining in a machining gap formed between an electrode and a work piece. The power supply comprises a direct current power source, a switching element connected between the direct current power source and the processing gap, a gate pulse generating circuit which generates a gate pulse signal for energizing the switching element and a protection network connected between the switching element and the gate pulse generating circuit. The protection network comprises a clock pulse generator which generates clock pulses, a counter which counts clock pulses while gate pulse signals are being received and generates an output having a predetermined level when the count reaches a predetermined value, a latch circuit which maintains the output of the predetermined level of the counter while the gate pulse signal is being received, and an AND gate which prevents gate pulse signal from being supplied to switching element while the latch circuit maintains the output of the counter as the predetermined level.

6 Claims, 3 Drawing Sheets

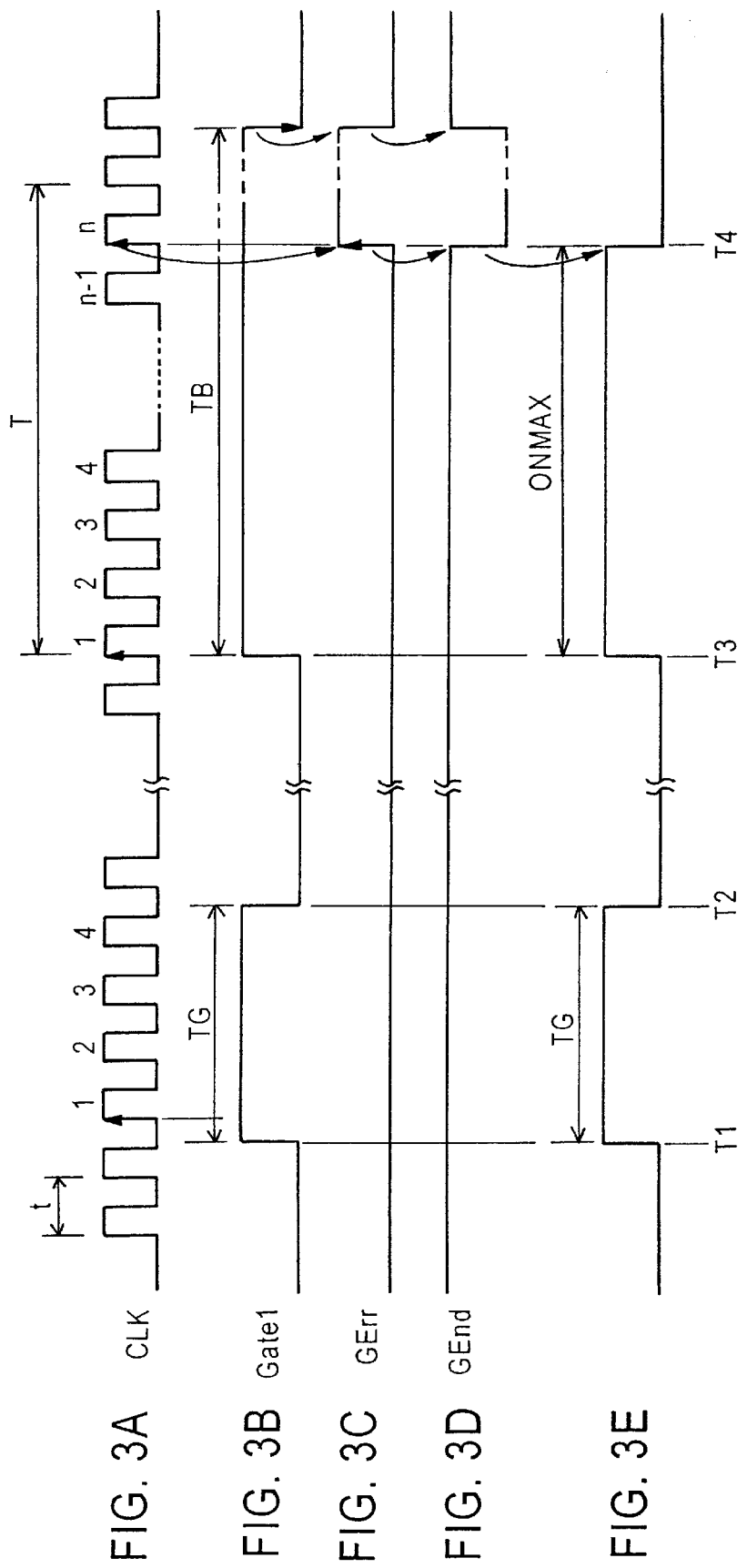

ELECTRIC DISCHARGE PROCESSING POWER SUPPLY HAVING A PROTECTION NETWORK FOR THE SWITCHING ELEMENT

FIELD OF THE INVENTION

The present invention relates to a discharge processing device which processes a work piece by generating a discharge in a processing gap which is formed between an electrode and the work piece. More particularly, the present invention relates to a discharge process power supply in which a switching element which generates a high frequency electrical power pulse is connected between a direct current power source and a processing gap.

BACKGROUND OF THE INVENTION

When power from a direct current power is applied to the processing "gap", a small gap formed between the tool electrode of an electric discharge processing device and a conductive work piece, the resistance of the dielectric liquid within the gap declines. When the insulating characteristic of the dielectric liquid is destroyed, a discharge is generated and machining "on-time" begins. A discharge current flows through the gap during a controlled "on-time" and as a result, work piece material evaporates or is dissolved. When the on-time is completed, application of power to the gap is stopped so that the insulation characteristics of the dielectric liquid are restored during the "off-time". In general, switching circuits made up of many switching transistors are set between the direct current power source and the gap in order to repeatedly supply high frequency power pulses from the direct current power source. The on-time/off-time switching operation of the switching transistor is controlled by gate pulse signals which have a controlled on-time and a controlled off-time. It is well known that minimizing the RL in the power supply circuit which supplies power from the direct current power source to the gap via the switching circuit as much as possible in order to decrease the rise time of the current which flow through the gap contributes to increasing the processing speed. For example, under conditions including a 280 V direct current power source output voltage, 0.02 Q power supply circuit resistance and 0.4 pH inductance, the current which flows through the gap rises as much as 3000 A to 1000 A within 5 $\mu$sec and reaches a saturation current of 14,000 A. As the switching circuit must withstand a saturation current of 14,000 A, the circuit requires 280 50 A transistors. Nevertheless, the maximum value of the discharge processing current pulse which is used in a wire cut electric discharge machine is approximately 1000 A to 2000 A so that the switching circuit of such a wire cut electric discharge machine usually comprises only 20 or 30 50 A transistors. As a result, when the on-time for the gate pulse signals exceeds the indicated value due to static and/or other factors, a large number of transistors may be damaged by excess current.

SUMMARY OF INVENTION

It is an object of the present invention to provide a power supply for electric discharge machining having a contact circuit which reliably protects the switching transistors, even if the on-time of the gate signal pulses exceeds the indicated value.

Other objects of the present invention will be related in the explanation which follows and/or will become clear to a person skilled in the art by practice of the invention.

In order to attain these objectives, a power supply for an electric discharge machine according to the invention is provided which intermittently supplies electric power for electric discharge processing of a machining gap which is formed between an electrode and a work piece, comprises:

a direct current power source;

a switching device connected between the direct current power source and the machining gap;

a gate pulse generator circuit for generating gate pulse signals to energize the switching device;

a clock pulse generator for generating clock pulses;

a counter for counting clock pulses while receiving gate pulse signals and for generating a predetermined level output when the pulse count reaches a predetermined level; and a circuit for maintaining the counter at a predetermined level while gate pulse signals are being received and preventing the gate pulse signals from being supplied to the switching element.

BRIEF DESCRIPTION OF FIGURES

FIGS. 3A, 3B, 3C, 3D and 3E are timing charts which illustrate the operation of the protection network of FIG. 1.

DETAILED DESCRIPTION OF THE PRESENTLY PREFERRED EMBODIMENT

Figure 1:
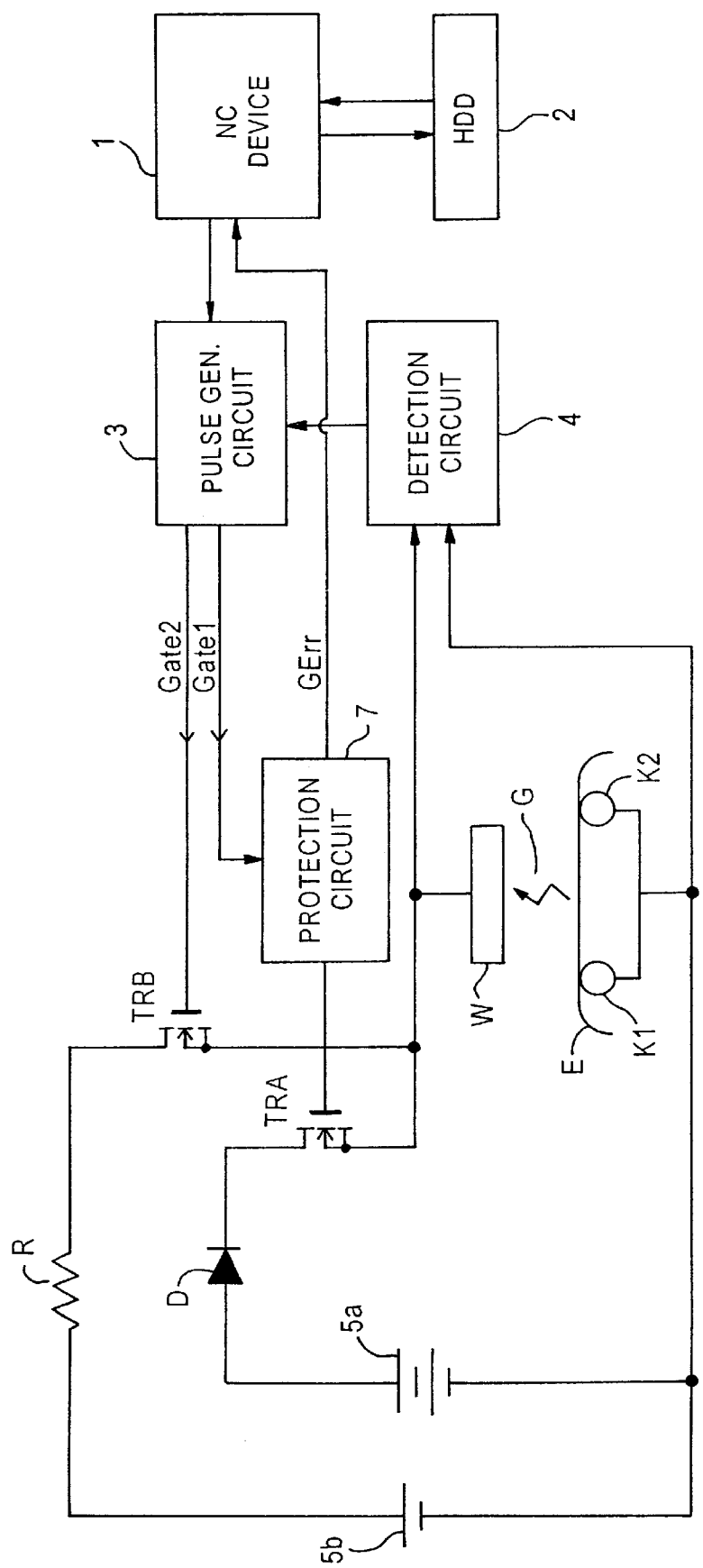
FIG. 1 is a diagram illustrating a power supply for electric discharge machining according to the present invention.

The power supply for discharge processing in the present invention will now be described with reference to FIG. 1. The negative side of a variable voltage 60–280 volt direct current power source 5a is electrically connected to a wire electrode E by a pair of conductive pieces, K1 and K2. The positive side of the direct current power source 5a is connected to the work piece W via a diode D and a switching element TRA. Similarly, the negative electrode of a variable voltage 80–120 volt direct current power source 5b is electrically connected to the wire electrode E from. The positive side of direct current 5b is connected to work piece W via a current limiting resistor R and a switching element TRB. The switching elements TRA and TRB respond respectively to gate pulse signals Gate 1 and Gate 2 and are switched between their conductive state and the non-conductive state. A gate pulse generating circuit 3 receives from the NC device signals which indicate the set value of the processing conditions and also receives signals from a detection circuit 4 which indicate the beginning of the discharge process. Gate pulse signals are generated based on these signals. The NC device 1 is provided with an input device, such as a keyboard, and a CRT display device (neither of which is indicated in the drawing) and the processing conditions are set by the NC devices. When the gate pulse generating circuit 3 first supplies the gate pulse signal Gate 2 to the switching element TRB, the voltage from the direct current power source 5b is applied to the gap G. As a result, discharge is generated at gap G and the current starts to flow through the gap G. The gate pulse generating circuit 3 receives signals which indicate the start of discharge from the detection circuit 4 and responds to those signals by stopping the supply of the gate pulse signal Gate 2 and supplying the gate pulse signal Gate 1, having an on-time TG to the switching element TRA. After the indicated on-time TG has elapsed, another off-time is indicated, and the gate pulse generating circuit 3 again supplies the gate pulse signal Gate 2 to the switching element TRB in order to generate the next discharge. Thus, repeated discharges are generated and the work piece W is processed.

The switching element TRA comprises a sufficient number of FET elements in order to protect the switch up to the indicated current capacity. These FET elements are indicated as a single switching element in an aggregate fashion in FIG. 1 operated as an on/off switching element responsive to the gate pulse signal Gate 1. In a practical embodiment of the present invention, the switching element TRA comprises a switching circuit made up of a first set consisting of 16 FET elements and a second set (making a total of 32) of FET elements. The withstand voltage of the respective FET elements is 500 V, the rated current is 20 A and the permissible current pulse is 50 A. As a result, switching element TRA is able to provide a current pulse having a peak value of 1600 A to the gap G. There exists a possibility that the on-time, TG, of the gate pulse signal Gate 1 which is input to a larger number of FET elements will exceed the indicated value due to a malfunction of gate pulse generating circuit 3 and outside static. In this case, when a large number of FET elements continues in a conductive state for an excessive period of time, excessive current flows to the switching circuit, which does not include a current limiting resistance, and there exists a possibility that the FET element will be damaged and that the printed substrate on which the FET element is mounted will burn.

A protection circuit, 7, which reliably prevents excess current and protects these FET elements is used in the discharge processing power supply of the present invention.

Figure 2:
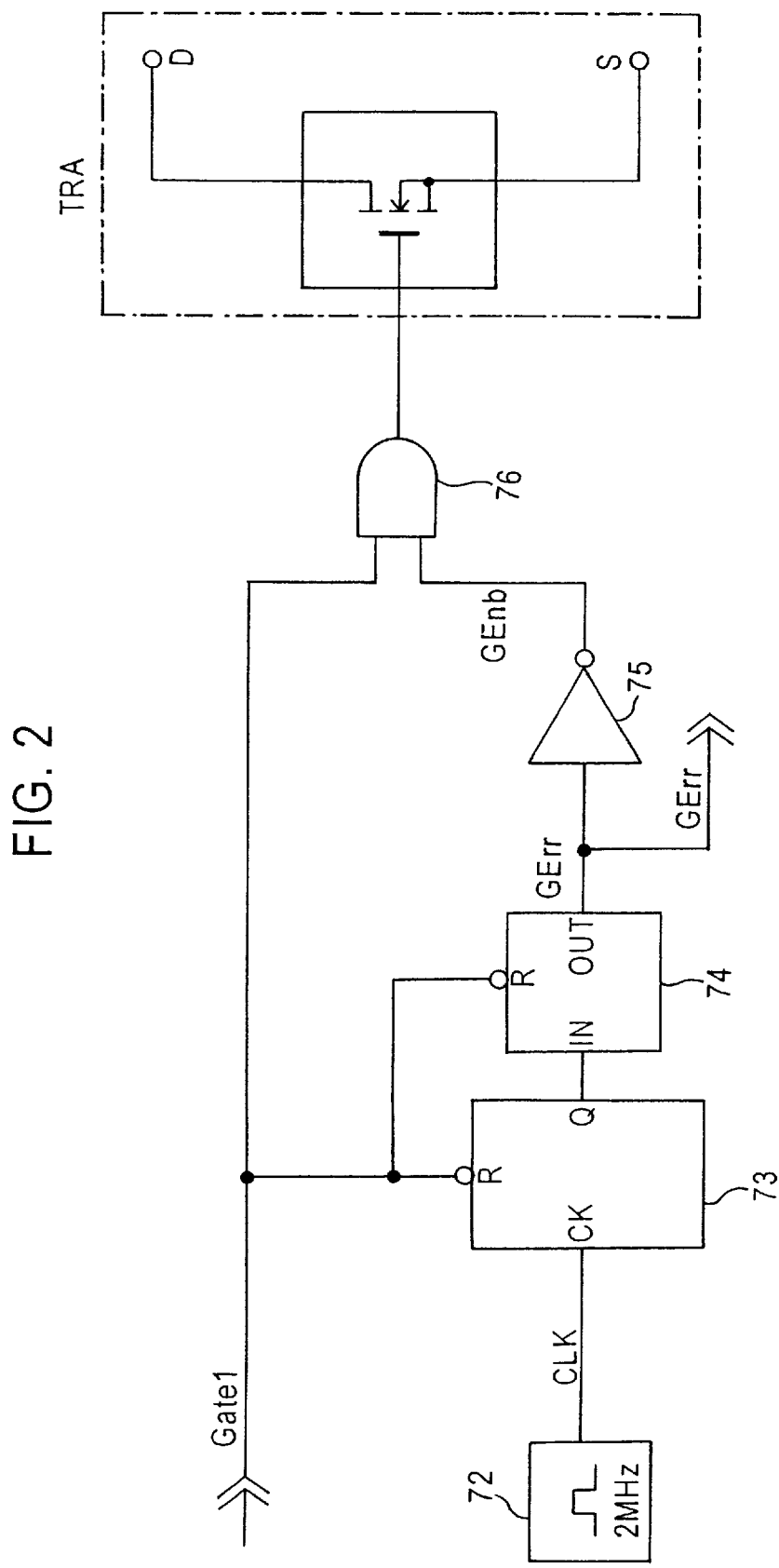
FIG. 2 is a diagram, illustrating a clock pulse generator and protection network of FIG. 1

The protection circuit 7 will now be described in detail with reference to FIG. 2.

The protection circuit 7 comprises a clock generator 72 which generates in this example a 2 MHz clock pulses CLK, a counter 73, a latch circuit 74, an inverter 75 and an AND gate 76. The counter 73 supplies a high [H] level output to the input terminal IN of the latch circuit 74 when clock pulses CLK are received by the input terminal CK and when the count of the clock pulses CLK reaches a predetermined value n. The predetermined value n is determined based on the time T at which the current pulse reaches the maximum permissible value and at time width t of one cycle of clock pulse CLK. The time width T is a larger value than the on-time TG of the gate pulse signal Gate 1. For example, if the time width T is 8 $\mu$sec and the time width t is 500 nsec, then the value n is T/t on 16. The counter 73 may also be configured as a shift register. The gate pulse signal Gate 1 is sent to counter 73 and to the latch circuit 74. When the gate pulse signal Gate 1 is as a low level [L], the counter 73 and the latch circuit 74 are reset. When the latch circuit 74 receives the high level [H] output from the counter 73 and generates an output signal having an [H] level at its output terminal OUT as error signal GErr. The error signal GErr is sent to an inverter 75 and the signal level is inverted. The error signal GErr is also sent to the NC device 1 in FIG. 1 and the NC device 1 displays an error signal on the CRT display device. The NC device 1 records the number and frequency of generations of the error signals GErr and the processing conditions when the error signals GErr are generated are recorded in an external storage device such as an HDD. Returning to FIG. 2, the gate pulse signals Gate 1 and output signals GEnb from the inverter 75 are sent to an AND gate 76. The gate pulse signals Gate 1 pass through the AND gate 76 when signals GEnb is at an [H] level, and the Gate 1 signal is supplied to switching element TRA.

The operation of protection network 7 will now be described with reference to FIGS. 3A, 3B, 3C, 3D and 3E.

FIG. 3A and FIG. 3B respectively illustrate the clock pulse CLK sent to protection network 7 and the gate pulse signal Gate 1 from the gate pulse generation circuit 3. FIG. 3C and FIG. 3D illustrate output signals GErr of latch circuit 74 and the output signals GEnb of inverter 75. FIG. 3E illustrates the gate pulse signal Gate 1 which is output from the AND gate 76 to the switching element TRA.

As illustrated in FIG. 3, the gate pulse generation circuit 3 supplies gate pulse signals Gate 1 having the on-time TG to the protection network 7 at time Ti. At this time, the reset mode of counter 73 is released, as indicated in FIG. 3A, and the clock pulses CLK are counted during on-time TG. When gate pulse signal Gate 1 goes off at time T2, the count of counter 73 is reset. If the count of counter 73 does not reach the indicated value n during the interval from time T1 to T2 the signals GErr is held at [L] level, as indicated in FIG. 3C and FIG. 3D, and the signal GEnb is maintained at a [H] level. As a result, the output signal from the AND gate 76 coincides with the gate pulse signal Gate 1, as indicated in FIG. 3E.

Next, the operation of the protection network 7 when a gate pulse signal Gate 1, having a time width TB which is larger than time width T, is mistakenly sent to the protection network 7. As indicated in FIG. 3A, the counter 73 counts the clock pulses CLK when the reset mode is released at time T3 while gate pulse signals Gate 1 are being received. When the count of counter 73 reaches an indicated value n at time T4, the output from counter changes to a [H] level. Then, the signal GErr changes to an [H] level and the signal GEnb changes to an [L] level, as indicated in FIG. 3C and FIG. 3D. When the AND gate 76 receives the [L] level signal GEnb, as indicated in FIG. 3E, the gate pulse signal Gate 1 is prevented from passing through. Then, the switching element TRA changes to non-conductive state even if the protection network 7 receives a gate pulse signal Gate 1. As a result, the conductive time of switching element TRA does not exceed time width ONMAX during the interval from time T3 to T4.

It should be understood that the present invention is not restricted to the precise form or embodiment disclosed. Rather, it should be understood that the invention includes many possible variations with reference to the above description.

The practical embodiment which is illustrated and described was selected to describe the essence of the present invention and its practical application. The scope of the invention is defined only by the scope of the claims.

What is claimed is:

1. A power supply for an electric discharge machine which supplies electrical power intermittently for electric discharge processing in a machining gap formed between an electrode and a work piece, the power supply comprising:

a direct current power source;

a switching element connected between the direct current power source and the machining gap;

a gate pulse generator for generating a gate pulse signal during a set on-time, the switching element being energized when receiving the gate pulse signal; and a protection means provided between the switching element and the gate pulse generator, for preventing the switching element from receiving the gate pulse signal if the gate pulse generator generates the gate pulse signal for a predetermined time period which is larger than the set on-time.

2. The power supply according to claim 1, in which the switching element includes a number of FET elements.

3. The power supply according to claim 1, in which the protection means includes
- a clock pulse generator for generating clock pulses;
- a counter for counting clock pulses while receiving the gate pulse signal and for generating an output having a predetermined level when the pulse count reaches a predetermined value which corresponds to the predetermined time period;
- a latch circuit which maintains a predetermined output level of the counter; and
- a logic gate which prevents the switching element from receiving the gate pulse signal while the latch circuit maintains said predetermined output level of the counter.

4. The power supply according to claim 1, further comprising a detection circuit connected to the gate pulse generator, for detecting the start of electric discharge at the machining gap, and wherein an on-time of the gate pulse signal starts at the start of electric discharge.

5. The power supply according to claim 1, further comprising an NC device which supplies a signal indicative of the set on-time to the gate pulse generator.

6. A power supply for an electric discharge machine which supplies electrical power intermittently for electric discharge processing in a machining gap formed between an electrode and a work piece, the power supply comprising:
- a direct current power source;
- a switching element connected between the direct current power source and the machining gap;
- a gate pulse generator for generating a gate pulse signal during a set on-time, the switching element being energized when receiving the gate pulse signal; and
- a circuit, responsive to the gate pulse signal, positioned between the switching element and the gate pulse generator to prevent the switching element from receiving the gate pulse signal when the gate pulse signal exceeds a predetermined on-time.

* * * * *